United States Patent

[11] 3,614,197

| [72] | Inventors | Jun-ichi Ni———,<br>Shojiro Kawakami; Kiyasu Zen'iti, all of Sendai-shi, Japan |
| --- | --- | --- |
| [21] | Appl. No. | 723,402 |
| [22] | Filed | Apr. 23, 1968 |
| [45] | Patented | Oct. 19, 1971 |
| [73] | Assignee | Semiconductor Research Foundation<br>Kawauchi, Sendai-shi, Japan |
| [32] | Priority | Apr. 27, 1967 |
| [33] | | Japan |
| [31] | | 42/27054 |

[54] SOLID OPTICAL WAVE GUIDE HAVING A RADIALLY VARYING REFRACTIVE INDEX
4 Claims, 8 Drawing Figs.

[52] U.S. Cl.................................................350/96 WG,
65/4, 65/DIG. 7, 250/227, 350/175 GN
[51] Int. Cl........................................................ G02b 5/14
[50] Field of Search........................................... 350/96, 96 WG

References Cited
UNITED STATES PATENTS
3,434,774   3/1969   Miller........................... 350/96

OTHER REFERENCES
Miller " Light Propagation in Generalized Lens-Like Media," The Bell System Technical Journal, Vol. 44, No. 9, pp. 2017– 2030 relied on, (complete article covers pp. 2017– 2065), Nov. 1965, 350– 96 (WG).

Kawa Kami et al. " Propagation Loss in a Distributed Beam Waveguide," Proceedings of the IEEE, Dec. 1965, pp. 2148, 2149, 350– 96 (WG).

*Primary Examiner*—John K. Corbin
*Attorney*—Stephen H. Frishauf

ABSTRACT: An apparatus for transmitting high-speed modulated light includes a solid optical waveguide comprising a medium having a refractive index which progressively decreases in the radial direction within the cross-sectional area of the optical waveguide so as to minimize variations in the average transmission velocity of the light beam in the axial direction of the guide which are caused by different routes of travel of the light beam.

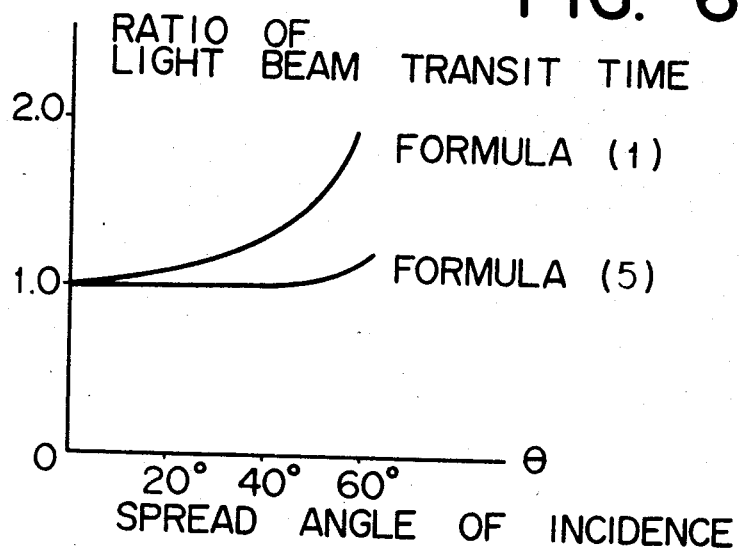
FIG. 6
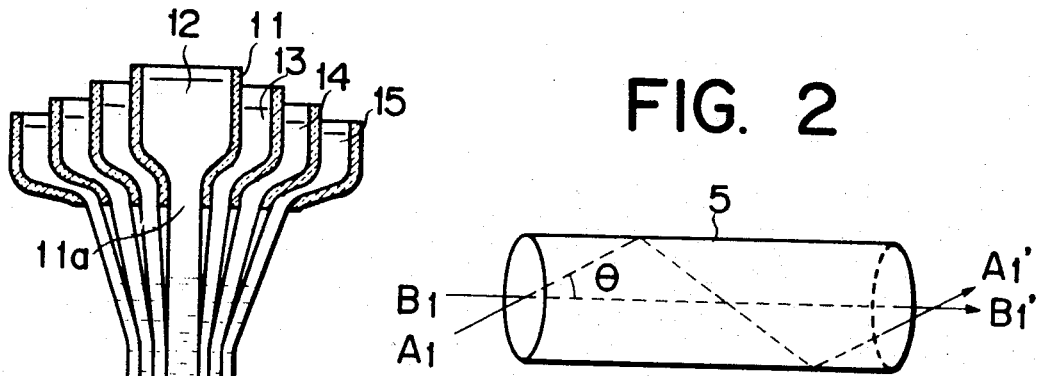
FIG. 2
FIG. 5
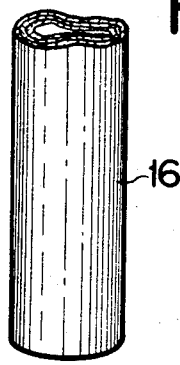
Jun-ichi NISHIZAWA,
Shojiro KAWAKAMI &
Zen'iti KIYASU,
INVENTORS
by Stephen A. Frishauf
Atty.

3,614,197

SOLID OPTICAL WAVE GUIDE HAVING A RADIALLY VARYING REFRACTIVE INDEX

BACKGROUND OF THE INVENTION

The present invention relates to an optical wave guide apparatus comprising a medium having a refractive index which progressively decreases in the radial direction within the cross-sectional area of the optical waveguide.

Generally, transmission of light beams is carried out by such an optical system as shown in FIG. 1. Namely, light issued from a source 1 generating light of fixed amplitude is amplitude or pulse modulated by a modulator 2 disposed outside of the light source 1, and is introduced into an optical waveguide 3, and then into a detector 4. There is another optical system causing light to be modulated therein by a light source member itself instead of an extra modulator 2 provided outside. Light entering the input side of the optical waveguide 3 generally consists of aggregated light beams having different angles of incidence. Since they are incident with the optical waveguide at different angles, light beams refract in the plane of incidence at varying angles according to their wavelengths. In the optical waveguide of the prior art, therefore, the incoming light beams displayed different transmission routes and time delays due to varying angles of incidence and wave lengths.

Accordingly, the conventional optical waveguide had the drawbacks that the change with time of the total light volume as observed on the output side of said guide exhibited time delays only in terms of the average and also that where a pulsating light was introduced, the form of such waves as represented by the change with time of the total light volume was unavoidably distorted on the output side of the guide.

There will now be described an optical pipe 5 as a concrete example of the conventional optical waveguide. As illustrated in FIG. 2, light beams are carried through the optical pipe 5 while being reflected by the inner wall thereof. If $\theta$ is taken to represent the angle defined by the light beam $A_1-A_1'$ in the plane of incidence with the axis of the optical pipe 5, then there will be established between the light beam $A_1-A_1'$ and the light beam $B_1-B_1'$ moving straight forward along the axis of the pipe 5 a relationship expressed by the following equation:

$$\frac{\text{Time required for light beam to proceed from } A_1 \text{ to } A_1'}{\text{Time required for light beam to proceed from } B_1 \text{ to } B_1'} = \frac{\text{Length of } A_1-A_1'}{\text{Length of } B_1-B_1'} = \frac{1}{\cos\theta} \quad (1)$$

In this case, a medium with which the conventional optical pipe 5 is packed, has a uniform refractive index and the light beams $A_1-A_1'$ and $B_1-B_1'$ have an equal velocity. Where it is assumed that light beams have various angles of incidence and refraction in the plane of incidence of the optical pipe 5, and a light pulse is transmitted for a length of approximately more than shown in the undermentioned equation (2), then the different routes whereby various light beams forming light pulses are carried through the optical pipe 5 will result in the various time delays of the light beams, thus noticeably distorting the form of the pulsating waves.

$$L \approx 2\tau/\theta^2 \times c/n \quad 2.$$

where:
$L=$ length of transmitted light where the light pulse is prominently distorted
$\tau =$ duration of the light pulse (pulse length)
$c =$ light velocity
$n =$ refractive index of a medium filled in the optical pipe
$\theta =$ spread angle of the incident light beams Equation (2) denotes that the greater the spread angle $\theta$ of the incident light beams, the shorter will be the length of transmitted light which causes the light pulse to be considerably distorted. Similarly, equation (1) indicates that the greater the angle $\theta$ defined by the light beam $A_1-A_1'$ with the axis of the optical pipe, the longer will be the time required for the light beam $A_1-A_1'$ to proceed from one end to the other of the pipe, thus causing the light pulse to be distorted. These obstructions appear in transmitting not only light pulses but also general amplitude-modulated light. Therefore the conventional optical pipe had the drawback of large light loses and the resultant distortion of signals. Also, it could not be substantially miniaturized.

There will now be described a clad optical fiber as another concrete example of a prior art optical waveguide. This fiber consisted of two media, one of which had a relatively large refractive index and the other of which was coated thereon and had a relatively small refractive index.

These refractive indices varied, as shown in FIG. 3, discontinuously on the boundary between the two media. Thus light was transmitted through the medium having a relatively large refractive index while being reflected by the boundary plane between these two media. In this case, however, the main guide path through which a light was transmitted had a uniform refractive index, so that as in the aforesaid optical pipe, the time light carried through the optical fiber presented variations according to the spread angle of the incident light, thus unavoidably resulting in the loss of light pluses and the distortion of signals.

SUMMARY OF THE INVENTION

The present invention comprises apparatus for transmitting high-speed modulated light which includes an optical waveguide in which the solid medium of which the guide is composed has a refractive index which is highest in the central part thereof and progressively decreases toward the periphery. The object of the invention is to provide an optical waveguide, which, where light is used as an information medium in telecommunication means and in electrical apparatus, for example, an electron computer, prevents the time of transmission from being varied due to the different routes of travel of light beams through the guide, thus keeping the introduced light free from distortions caused by the transmission medium.

BRIEF DESCRIPTION OF THE DRAWINGS

FIG. 2 indicates the routes whereby light beams are carried through the conventional optical waveguide;
FIG. 4(A) illustrates the routes whereby light beams are carried through the apparatus of the invention;
FIG. 5 shows a process of manufacturing an optical rod according to an embodiment of the present invention;
FIG. 6 compares the properties of the apparatus of the present invention for an optical waveguide with those of the prior art.

DETAILED DESCRIPTION OF THE INVENTION

In an optical waveguide 6 wherein, as shown in FIG. 4(A), the refractive index is increased along the central axis and progressively decreases away from the axis, light generally proceeds in a meandering way as shown in FIG. 4(B). For convenience of explanation, there is set up a plane XOZ in a longitudinal cross-sectional area including the central axis of the optical waveguide with the center of the plane of incidence denoted by 0, and an axis in the radial direction by X and an axis in the direction of transmission along the central axis by Z. When the light beam $A_2-A_2'$ travelling in a meandering way is compared with the light beam $B_2-B_2'$ moving along axis Z, namely, the central axis of the optical waveguide, some portions of the meandering light beam $A_2-A_2'$ have a smaller velocity in the direction of Z around axis Z than of the straight moving light beam $B_x-B_x'$. In the peripheral region of the guide 6 apart from axis Z, part of the meandering light beam $A_x-A_x'$ is aligned approximately parallel with axis Z, and also has its refractive index more reduced near the peripheral region than around axis Z, thus causing that part of the light beam $A_x-A_x'$ to travel at a great velocity in the peripheral region. In fact, the aforementioned part of meandering light beam $A_x-A_x'$ has a greater velocity near the peripheral region of the optical waveguide 6 than the straight travelling light beam $B_x-B_x'$. As described above, the meandering light beam $A_x-A_x'$ comprises portions carried at a greater and a smaller velocity in the direction of Z than the light beam $B_x-B_x'$ travelling straight along axis Z, so that the average rate of such meandering motion, the average velocity of the meandering light beam $A_x-A_x'$ is almost the same as that of the light beam $B_x-B_x'$ carried straight along the central axis of the optical waveguide.

With respect to the formation of an optical waveguide having the aforementioned properties, there will now be described an equation showing the distribution of a refractive index within the guides as determined by quantitative analysis by reference to some examples of said distribution.

Let it be assumed that a light beam moves in the previously mentioned plane XOZ. The distribution $n(x)$ of the refractive index of a medium forming the guide may be theoretically expressed as follows:

$$n(X) = n_0[1 - \tfrac{1}{2}(x/L)^2] \qquad 3.$$

where:

$n_0$ = refractive index on the central axis of the optical waveguide, or axis Z (namely, $n_0 = n(0)$)

Figure 1:
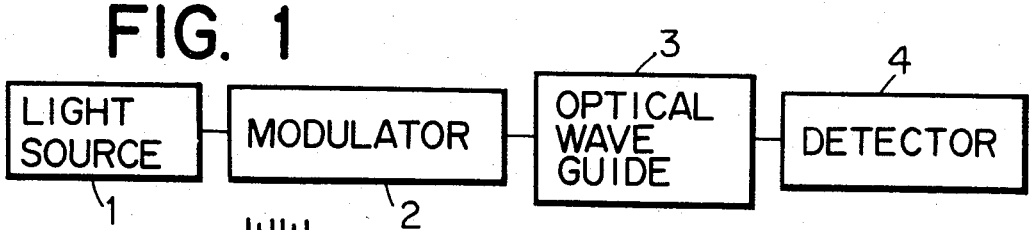
FIG. 1 shows the conventional optical waveguide.
Figure 3:
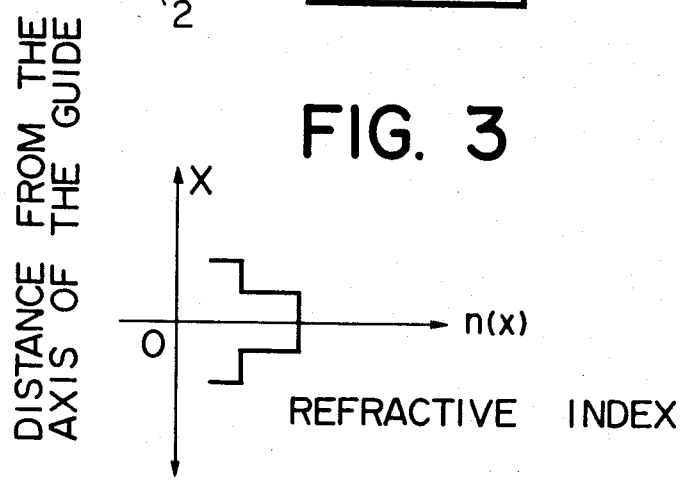
FIG. 3 shows the distribution of the refractive index within the cross-sectional area of the conventional clad optical fiber.
Figure 4:
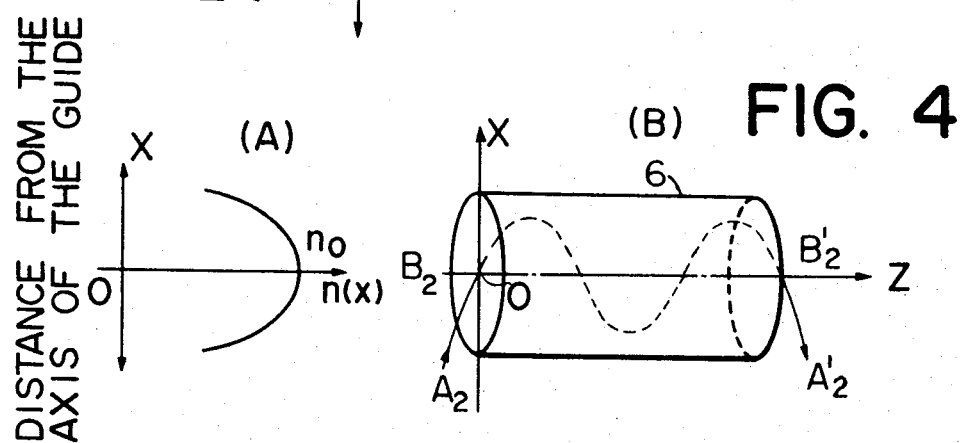
FIG. 4 (B) shows the distribution of refractive index within the cross-sectional area of an apparatus of the present invention for an optical waveguide.

$x$ = distance in the radial direction in the cross-sectional area of the optical waveguide $L$ = distance from the center of the waveguide to the point at which the refractive index is equal to one half of that of the center;

Equation (3) denotes the refractive index distribution $n(x)$ as a secondary function of $x$ alone, said distribution $n(x)$ forming a parabolic line as shown in FIG. 4 (A). Where, as illustrated in FIG. 4(B), a meandering light beam intersects axis Z at angle $\theta$ at point X–0 in plane XOZ, the average velocity $\overline{Vz}$ of said beam in the direction of axis Z may be theoretically considered as follows:

$$\overline{Vz} = \frac{C}{n} \cdot \frac{\cos\theta}{1+\cos^2\theta} \times 2 \qquad (4)$$

(S. Kawakami and J. Nishizawa "On an Optical Waveguide With a Nonuniform Distribution of a Refractive Index, Research Institute of Electrical Communication Technical Report Th-20, 1967)

With the optical waveguide of the present invention containing a medium having such a refractive index distribution $n(x)$ as expressed by equation (3), the left term of equation (1) may be calculated as follows:

$$\frac{\text{Average travelling time of meandering light beam}}{\text{Average travelling time of light beam carried straight along the axis of the path}}$$

$$= \tfrac{1}{2}\left(\cos\theta + \frac{1}{\cos\theta}\right) \qquad (5)$$

FIG. 6 presents a comparison of equations (1) and (5) for the same degrees of incidence angle $\theta$. This FIG. indicates the relationship between said angle $\theta$ and the ratio of travelling time which a light beam carried straight along the axis of the path bears to another light beam intersecting said axis at angle $\theta$ in the plane of incidence.

As clearly seen from FIG. 6, the travelling times of light beams have a more stable ratio in equation (5) than the equation (1). Therefore the optical waveguide according to the present invention wherein the refractive index distribution exhibits such a pattern as indicated by equation (3) will enable the light pulse to be less subject to distortions. It is also apparent from FIG. 6 that an optical waveguide wherein the refractive index distribution approximates that indicated by equation (3) will offer properties close to those of an optical waveguide wherein the refractive index distribution exactly follows equation (3). Further referring to equation (3), the refractive index distribution applicable in the optical waveguide of the present invention will fall within the following range, with $x_M$ taken to represent a maximum value of $x$.

$$0.1 < \frac{n_0 - n\left(\frac{x_M}{2}\right)}{n_0 - n(x_M)} < 0.9 \qquad (6)$$

Another example of the refractive index distribution of a medium adapted to obtain an optical waveguide according to the present invention will be given. Said distribution may be expressed by the following equation. $n(x) = n_0/\cosh(x/L)$. 7.

In the case of $n_0 = n(O)$, then a meandering light beam intersecting axis Z at an angle $\theta$ at point X–0 will have the following average velocity $\overline{Vz}$ in the direction of axis Z.

$$\overline{Vz} = c/n_0$$

In this case, the time a light beam travels in a meandering way through the waveguide will be kept constant regardless of the angle $\theta$ of incidence, so that the light pulse will be completely saved from distortions.

Let us take still another example of the refractive index distribution occurring in an optical waveguide according to the present invention. Where circular cylindrical coordinates are set up with the intersection of the plane of incidence and the central axis of an optical waveguide taken as the base point, then there will be occasions where the refractive index distribution $n(r)$ may be expressed by the equation $$n(r)^2 = n_0^2[1 - (r/L)^2 + \delta(r/L)^4] \qquad 8.$$

where:

$n_0 = n(O)$ $r$ = distance in the radial direction within the cross-sectional area of an optical waveguide.

In this case, it will be most preferable to select a value between two-thirds and 1 for $\delta$. Next referring to equation (8), the refractive index distribution applicable to an optical waveguide of the present invention will fall within the under mentioned range with $r_M$ taken to represent a maximum value of $r$.

$$0.1 < \frac{n_0 - n(r_{M/2})}{n_0 - n(r_M)} < 0.9 \qquad (9)$$

In general, the spread angle $\theta$ of the incident light is often employed within a limited range. With 30° taken to represent 30° upper limit of angle $\theta$, it will be suitable to adopt a refractive index distribution ranging from the refractive index $n_0$ on the central axis of the transmitting path to 0.866 $n_0$. Within this range, it will be desirable to form a refractive index distribution $n$ in such a manner that it will follow a parabolic line shown in equation (3).

There will now be described the method of manufacturing an embodiment of the present invention wherein the refractive index of an optical fiber is highest in the central part and progressively decreases toward the peripheral region. Into a multistepped funnel-shaped heating vessel 11 formed from a plurality of funnel-shaped heating vessels or kettles having different inner diameters and arranged coaxially with each other as shown in section in FIG. 5, there are introduced starting from the innermost vessel various kinds of glass material, such as F2(12) (refractive index: 1.62004, softening point: 465° C; thermal expansion coefficient $90 \times 10^{17}/oC$), F8(13) (refractive index: 1.59551, softening point: 465° C; thermal expansion coefficient: $89 \times 10^{17}/oC$), LF7(14) (refractive index: 1.57501, softening point: 474° C; thermal expansion coefficient: $86 \times 10^{17}/oC$), and LLF4(15) (refractive index: 1.55768, softening point: 475° C; thermal expansion coefficient: $86 \times 10^{17}/oC650°$ C. These four kinds of glass material are selected in such a manner that they have approximately the same softening point and thermal expansion coefficient, but progressively decline in the refractive index starting from the innermost to the outermost. The glass materials melted by heating beyond their respective softening points are drawn out of the outlet 11a at the bottom of the multistepped heating vessel 11. The four kinds of glass material are fused together in a manner to convert the respective glass members positioned inside by turns and form a four-layered optical rod 16 as illustrated in FIG. 5. In this case, the optical rod 16 will be about 1.0 cm. in diameter and the outer diameters of the respective glass layers will have a ratio of 0.6 : 1 : 1.5 : 1.7 starting with the innermost one. The molten glass mass is drawn from the outlet 11a at the rate of one meter per minute. Where errors in the ratio of outer diameters were less than 10 percent, there were observed pulse distortions when light pulses of 3ns were transmitted through an optical rod 3 meters long. The optical rod 16 thus obtained is further heated at around the softening points of the respective glass components for several hours or several hundreds of hours to cause their mutual diffusion and to thereby obtain an ideal refractive index distribution as described above. When the optical rod 16 subjected to the aforesaid diffusion treatment is transformed into a fiber in a single step, it is further thermally drawn into a fiber scores or hundreds of microns in diameter. In a two-step transformation process, only those portions of the raw glass material of the optical rod 16 which have not been fully transformed in the first step are further subjected to the thermal diffusion treatment in the second step. This two-step process can produce an optical fiber which keeps the light pulse free from distortions.

Figure 7:
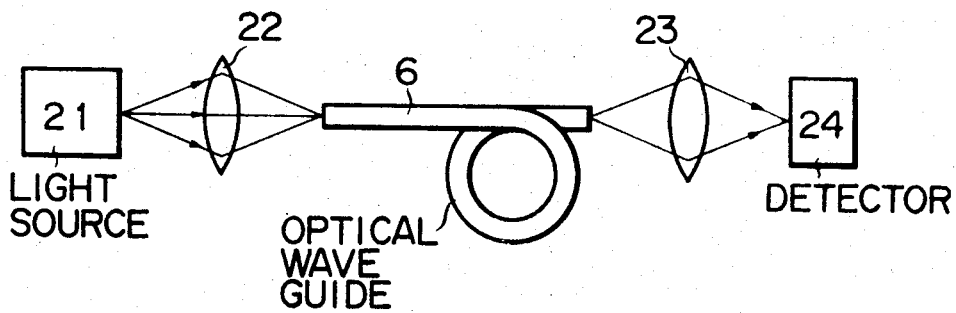
FIG. 7 illustrates an optical system using an embodiment of the present invention.

Referring to FIG. 7 showing an embodiment of the present invention, amplitude or pulse modulated light, which is issued from a source 21, for example, a semiconductor laser, is introduced through a lens 22 into one end of an optical waveguide 6. This guide is a naturally flexible optical fiber consisting of a medium whose refractive index progressively decreases in the radial direction within the cross-sectional area thereof. Even if rendered flexible, the properties of the guide will not be deteriorated. A light from the guide 6 is carried into a detector 24 either directly or after being focused by a lens 23 so as to detect a signal. As clearly seen from the concept of the present invention, the guide 6 greatly reduces the occurrence of waveform distortions, for example, those of a light pulse. For convenience of description up to this point, the two end faces of the guide 6 are connected to a light source and light detector. In practice, however, it is necessary to limit such connection to a simple light source and light detector. Namely, if the guide is connected to a combination of such members as will mutually interact through a medium of light, then it is obvious that the concept of the present invention will be directly applicable. For example, both ends of the guide may be provided with a pair of semiconductor lasers mutually affecting the spectrum, power or direction of light.

As mentioned above, an optical fiber consisting of a solid optical medium according to the present invention can provide a compact optical waveguide which minimizes loss of light pulses and the resultant signal distortions, thus ensuring higher reliability and greater informational capacity.

Accordingly, the present waveguide is suitable for use in pulse transmission.

THe foregoing description relates to an optical waveguide mainly consisting of an optical fiber. However, it will be apparent that the object of the present invention may also be applicable in a pipe-type optical waveguide. In addition, the invention may be employed in a surface wave permeable film circuit which is so arranged as to have a greater dielectric constant in the central part than in the peripheral region and cause the refractive index t increase in the central part and decrease in the peripheral region, namely, to produce a continuous, approximately parabolic pattern of a refractive index distribution. There is also a modification of the surface wave permeable film circuit wherein the thickness of the central part is made gently to decline toward the peripheral region in the direction of light transmission thereby to focus an introduced light and display the functional effect of the present invention. To give another example of applying the present invention, there is an optical waveguide wherein the refractive index is caused to vary also in the average direction of light transmission thereby to improve the matching of both ends of the guide.

While the invention has been described in connection with some preferred embodiments thereof, the invention is not limited thereto and includes any modifications and alterations which fall within the scope of the invention.

What is claimed is:

1. In an apparatus for transmitting high-speed modulated light, an optical waveguide device comprised of solid optical material having a refractive index on the central axis of $n_0$, and a refractive index $n(r)$ at a radial distance $r$ (in circular cylindrical coordinates) from said axis which progressively decreases in the radial direction of the guide in accordance with the following equation:

$$n(r)=n_0^2[1-(r/L)^2+\delta(r/L)^4+...]$$

where:

$\delta$ satisfies the condition $2/3 < \delta < 1$, $L$ is the distance from the center of the waveguide to the point at which the refractive index is equal to one-half of that of the center; $n_0$ is taken to be equivalent to $n(0)$, and $n$ has a value falling within the following range $$0.1 < \frac{n_0-n(r_M/\sqrt{2})}{n_0-n(r_M)} < 0.9.$$

2. Apparatus according to claim 1 wherein the solid optical material comprises an optical fiber.

3. Apparatus according to claim 1 wherein the solid optical material comprises an optical pipe.

4. Apparatus according to claim 1 wherein said solid optical material includes a plurality of optical glasses diffused together.